United States Patent [19]

Berry, Jr.

[11] Patent Number: 5,488,935
[45] Date of Patent: Feb. 6, 1996

[54] PRESSURIZED OIL INJECTION PRE-LUBRICATION SYSTEM

[76] Inventor: Robert L. Berry, Jr., R.F.D. 1 Box 1210, Embden, Me. 04958

[21] Appl. No.: 373,613

[22] Filed: Jan. 17, 1995

[51] Int. Cl.⁶ ............................................. F01M 5/00
[52] U.S. Cl. ............................ 123/196 S; 184/6.3
[58] Field of Search .................. 123/196.5; 184/6.3, 184/6.4

[56] References Cited

U.S. PATENT DOCUMENTS

| | | | |
|---|---|---|---|
| 2,300,722 | 11/1942 | Adams et al. | |
| 2,394,401 | 2/1946 | Overbeke | |
| 2,397,796 | 4/1946 | Lippincott | |
| 2,747,564 | 5/1956 | Wehling | 123/196 S |
| 3,422,807 | 1/1969 | Waldecker | 123/196 S |
| 3,583,525 | 6/1971 | Holcomb | 123/196 S |
| 3,722,623 | 3/1973 | Waldecker | 123/196 S |
| 4,061,204 | 12/1977 | Kautz, Jr. | 123/196 S |
| 4,513,705 | 4/1985 | Evans | 123/196 S |
| 4,769,989 | 9/1988 | Ostwald et al. | |
| 5,069,177 | 12/1991 | Dokonal | 123/196 S |
| 5,147,014 | 9/1992 | Pederson | 123/196 S |
| 5,156,120 | 10/1992 | Kent | 123/196 S |
| 5,197,424 | 3/1993 | Blum | 123/196 S |
| 5,197,787 | 3/1993 | Matsuda et al. | |

*Primary Examiner*—Erick R. Solis
*Attorney, Agent, or Firm*—Michael I. Kroll

[57] ABSTRACT

A pressurized oil injection pre-lubrication system for an oil gallery in an engine block of an engine in a motor vehicle comprising a pressure accumulator and a normally closed electromagnetic valve. A component is for fluidly connecting the pressure accumulator to the electromagnetic valve. Another component is for fluidly connecting the electromagnetic valve to the oil gallery in the engine block. An ignition switch is electrically connected to the electromagnetic valve. When the ignition switch is turned to an on position, the electromagnetic valve will open to allow oil from the pressure accumulator to flow into the oil gallery in the engine block, before the ignition switch is turned to a start position to start the engine in the motor vehicle.

5 Claims, 2 Drawing Sheets

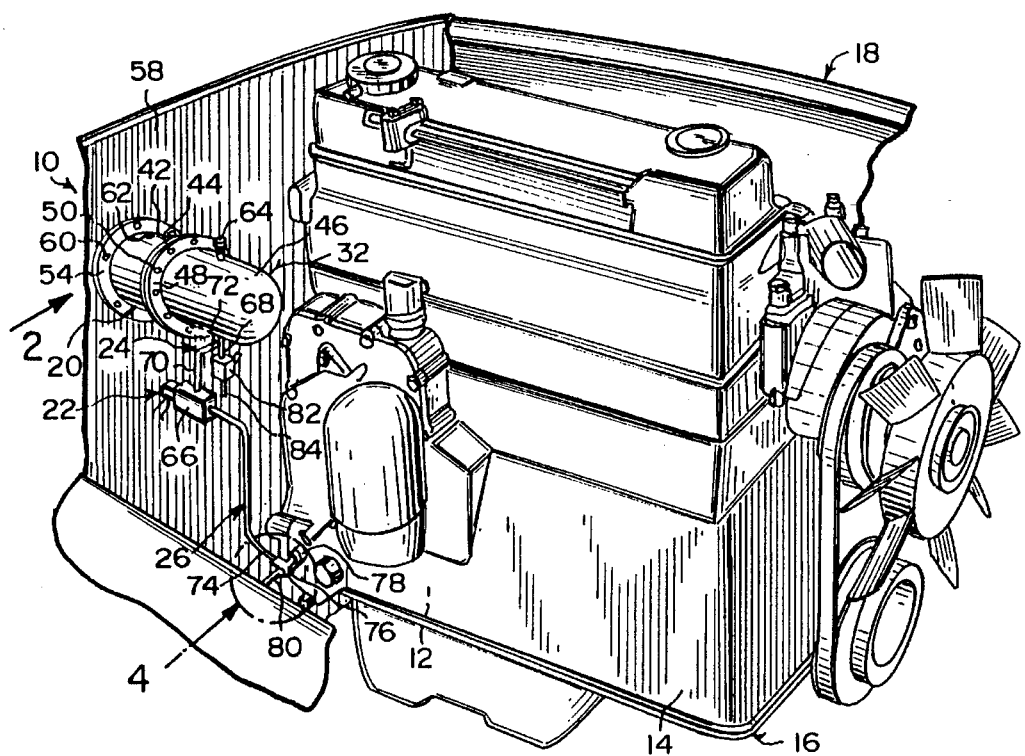
Fig. 1
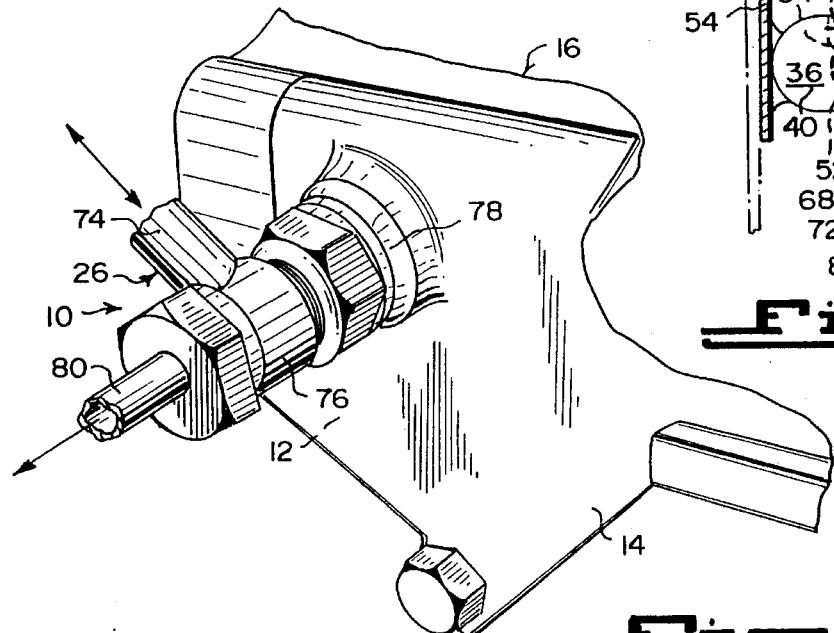
Fig. 2
Fig. 4

PRESSURIZED OIL INJECTION PRE-LUBRICATION SYSTEM

BACKGROUND OF THE INVENTION

1. Field of the Invention

The instant invention relates generally to hydraulic accumulators and more specifically it relates to a pressurized oil injection pre-lubrication system.

2. Description of the Prior Art

Numerous hydraulic accumulators have been provided in prior art. For example, U.S. Pat. Nos. 2,300,722 to Adams et al.; 2,394,401 to Overbeke; 2,397,796 to Lippincott; 4,769,989 to Ostwald et al. and 5,197,787 to Matsuda et al. all are illustrative of such prior art. While these units may be suitable for the particular purpose to which they address, they would not be as suitable for the purposes of the present invention as heretofore described.

ADAMS, HAROLD W.

KLEINHANS, EARL S.

HYDRAULIC PRESSURE FLUID ACCUMULATOR

U.S. Pat. No. 2,300,722

In a hydraulic pressure system: a dual pressure tank comprising a plurality of shells defining a primary chamber and a secondary chamber having an elastic wall in common. The primary chamber has a substantially centrally located port and contains fluid under an initial pressure less than the governed liquid pressure of the system. The secondary chamber has a substantially centrally located port connected to the system. The elastic wall has substantially rigid valve members on each side of the wall and is located substantially at the center thereof for sealing either the primary port or the second port in response to a differential between the fluid and liquid pressures, and for protecting the elastic wall against extrusion through the ports.

OVERBEKE, JOHN WILLIAM

SECTIONAL ACCUMULATOR

U.S. Pat. No. 2,394,401

A pressure accumulator comprising a shell section having a confining rib extending from its terminal edge, a second shell section and an inwardly deformable gasket between the sections. A wedge face on at least one of the sections is capable of directing the gasket inwardly. A diaphragm has its edges between the rib and the second shell section. A structure is for drawing and holding the sections together while clamping the gasket inwardly against an edge of the diaphragm.

LIPPINCOTT, WELLS A.

ACCUMULATOR

U.S. Pat. No. 2,397,796

An accumulator having, in combination, a rigid container having openings at opposite ends. A cup of molded flexible material is disposed within the container and attached to one end in communication with one of the openings. An inturned annular rib of rounded cross-section is molded around the cup at the open end thereof. A second cup of molded flexible material is disposed within the container and has its open end overlapping the rib externally thereof and secured thereto.

OSTWALD, FRITZ

KLEIN, HANS-CHRISTOF

BLUM, KLAUS-DIETER

DEVICE FOR CONTROLLING THE PRESSURE IN THE AUXILIARY-PRESSURE SUPPLY SYSTEM OF A BRAKE UNIT

U.S. Pat. No. 4,769,989

A device for controlling the pressure in an auxiliary-pressure supply system of a hydraulic brake unit for automotive vehicles. The device comprises a diaphragm-type or bladder-type accumulator equipped with a hydraulic and electric switching arrangement by way of which the hydraulic pressure in the pressure accumulator can be reduced to a predetermined value after the engine of the vehicle has been turn off. An electromagnetic multidirectional control valve is used to divert hydraulic fluid back to a reservoir through a pressure-limiting valve connected downstream thereof. After the engine of the vehicle has been turned off, the multidirectional control valve remains open until the accumulator pressure has decreased to at least the gas inflation pressure of the accumulator. The invention reduces permeation of gas molecules through the diaphragm of the accumulator into the hydraulic fluid and thus effects a longer useful life of the pressure accumulator.

MATSUDA, SHOHEI

TASHIMA, KAZUTOSHI

FURUYA, KOHICHI

MYOI, MASAAKI

PRESSURE SUPPLY SYSTEM HAVING MEANS FOR CONTROLLING AN OUTPUT PRESSURE THEREOF

U.S. Pat. No. 5,197,787

A pressure supply system for a vehicle according to the invention incorporates a pump and an accumulator in which an output pressure of the pump is maintained within a prescribed range by controlling the on-off operation of the pump according to the inner pressure of the accumulator. by changing the prescribed range of pressure according to the actual pressure requirement, for instant according to the change in the travelling speed of the vehicle, the burden on the system is reduced. The prescribed range can be changed either by simply changing the upper and/or lower pressure limits at which the pump is deactivated and activated, respectively, or by operating the pump for a prescribed time period which is dependent on the pressure requirement after a certain reference pressure value is reached. Thus, the structure of the fluid pressure system is simplified, and the generation of unnecessary high pressure can be avoided.

SUMMARY OF THE INVENTION

A primary object of the present invention is to provide a pressurized oil injection prelubrication system that will overcome the shortcomings of the prior art devices.

Another object is to provide a pressurized oil injection pre-lubrication system, that utilizes a hydraulic accumulator in combination with an ignition switch controlled electromagnetic valve, to supply cold start oil to an engine.

An additional object is to provide a pressurized oil injection pre-lubrication system, that will extend the life of any engine requiring oil pressure for lubrication during start up and could be adapted to any type of motor vehicle as an after market kit.

A further object is to provide a pressurized oil injection pre-lubrication system that is simple and easy to use.

A still further object is to provide a pressurized oil injection pre-lubrication system that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 1 is a perspective view of a portion of a motor vehicle, showing the instant invention installed into the oil gallery of the engine block.

FIG. 2 is a diagrammatic elevational view partly in cross section taken in the direction of arrow 2 in FIG. 1.

FIG. 4 is an enlarged perspective view as indicated by arrow 4 in FIG. 1, showing the tee fitting assembly between the oil gallery connector port, the high pressure oil line and the conduit to the oil pressure gauge in greater detail.

Similar reference characters denote corresponding features consistently throughout the attached drawings.

DETAILED DESCRIPTION OF THE PREFERRED EMBODIMENTS

Figure 3:
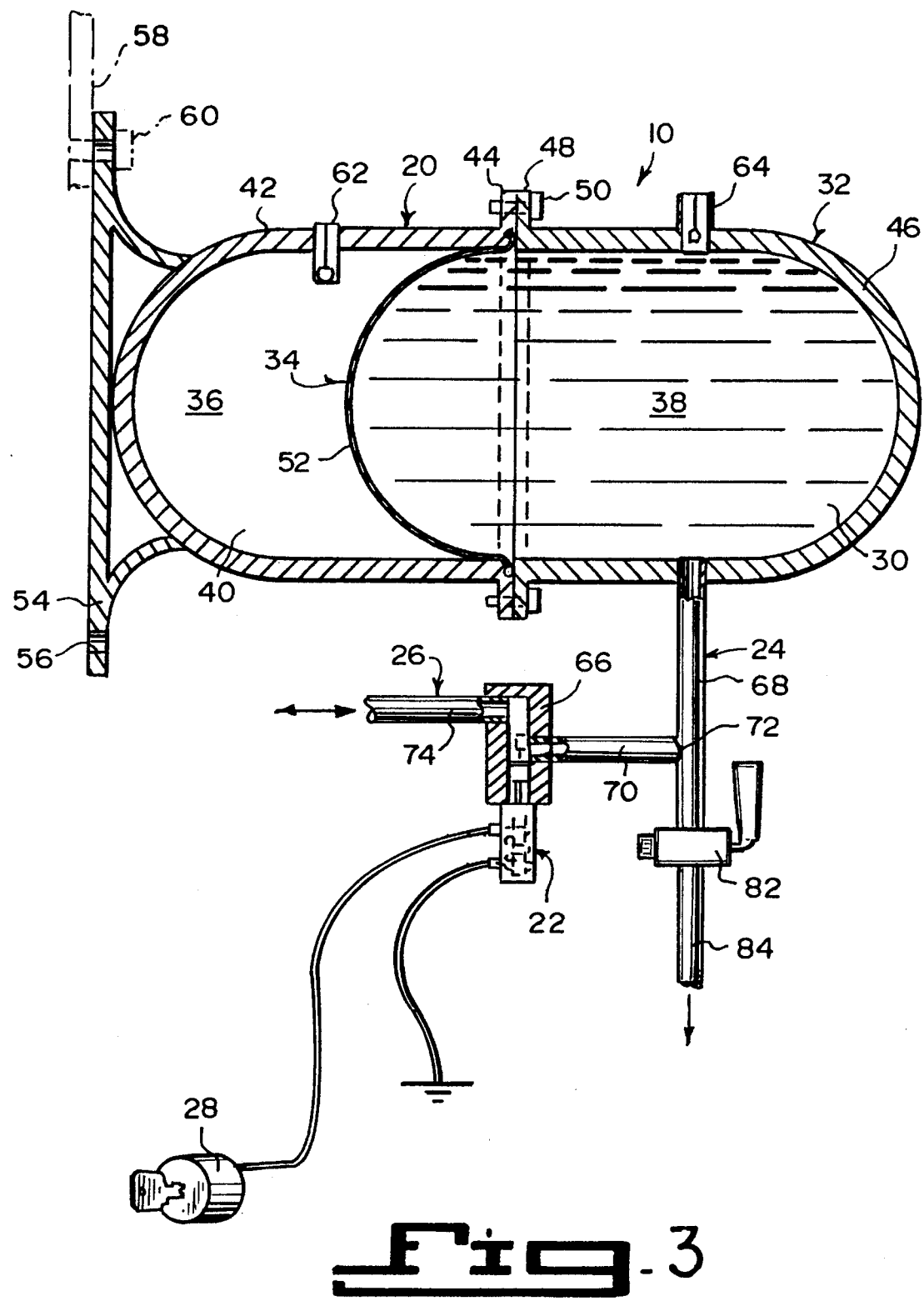
FIG. 3 is an enlarged diagrammatic elevational view partly in cross section similar to FIG. 2, showing the electrical connection between the electromagnetic valve and the ignition switch shown in perspective.

Turning now descriptively to the drawings, in which similar reference characters denote similar elements throughout the several views, FIGS. 1 through 4 illustrate a pressurized oil injection pre-lubrication system 10 for an oil gallery 12 in an engine block 14 of an engine 16 in a motor vehicle 18, comprising a pressure accumulator 20 and a normally closed electromagnetic valve 22. A component 24 is for fluidly connecting the pressure accumulator 20 to the electromagnetic valve 22. Another component 26 is for fluidly connecting the electromagnetic valve 22 to the oil gallery 12 in the engine block 14. An ignition switch 28 is electrically connected to the electromagnetic valve 22. When the ignition switch 28 is turned to an on position, the electromagnetic valve 22 will open to allow oil 30 from the pressure accumulator 20 to flow into the oil gallery 12 in the engine block 14, before the ignition switch 28 is turned to a start position to start the engine 16 in the motor vehicle 18.

The pressure accumulator 20 consists of a storage tank 32. a flexible wall 34 is within the storage tank 32, for dividing the storage tank 32 into two compartments 36, 38. The first compartment 36 is for holding pressurized gas 40 therein, while the second compartment 38 is for holding the oil 30 therein.

The storage tank 32 includes a first shell section 42 with the first compartment 36 and having an annular flange 44 thereabout. A second shell section 46 with the second compartment 38 has an annular flange 48 thereabout. A plurality of bolts 50 are for securing the annular flanges 44 and 48 together.

The flexible wall 34 is a diaphragm 52 having its circumference sealed between the annular flanges 44 and 48 to separate the pressurized gas 40 from the oil 30. An annular mounting bracket 54 is connected to the first shell section 42. The mounting bracket 54 has a plurality of holes 56 thereabout, so that it can be affixed to a fire wall 58 in the motor vehicle 18 with a plurality of bolts 60.

A gas injection valve 62 is in the first shell section 42, to allow gas to enter the first shell section. An air bleeder valve 64 is in the second shell section 46, to allow air to exit the second shell section. The electromagnetic valve 22 includes a valve body 66 positioned between the first fluidly connecting component 24 and the second fluidly connecting component 26.

The first fluidly connecting component 24 consists of a first conduit 68 connected at a first end to the second shell section 46 of the storage tank 32. A second conduit 70 is connected at a first end by a tee connection 72 to the first conduit 68 and at a second end to a first side of the valve body 66 of the electromagnetic valve 22.

The second fluidly connecting component 26 includes a high pressure oil line 74 connected at a first end to a second side of the valve body 66 of the electromagnetic valve 22. A tee fitting assembly 76 is to connect a second end of the high pressure oil line 74 between an oil gallery connector port 78 and a pipe 80 to an oil pressure gauge within the motor vehicle 18.

A petcock valve 82 is connected to a second end of the first conduit 68 of the first fluidly connecting component 24. A drain tube 84 extends from the petcock valve 82. When the petcock valve 82 is opened, the oil 30 in the second shell section 46 can be drained therefrom.

LIST OF REFERENCE NUMBERS 10 pressurized oil injection pre-lubrication system
12 oil gallery in 14
14 engine block of 16
16 engine in 18
18 motor vehicle
20 pressure accumulator
22 normally closed electromagnetic valve
24 first fluidly connecting component
26 second fluidly connecting component
28 ignition switch
30 oil
32 storage tank of 20

-continued

LIST OF REFERENCE NUMBERS 34 flexible wall in 32
36 first compartment in 32
38 second compartment in 32
40 pressurized gas in 36
42 first shell section of 32
44 annular flange of 42
46 second shell section of 32
48 annular flange of 46
50 bolt
52 diaphragm for 34
54 mounting bracket on 42
56 hole in 54
58 fire wall in 18
60 bolt
62 gas injection valve in 42
64 air bleeder valve in 46
66 valve body of 22
68 first conduit of 24
70 second conduit of 24
72 tee connection between 68 and 70
74 high pressure oil line of 26
76 tee fitting assembly of 26
78 oil gallery connector port
80 pipe leading to oil pressure gauge or oil sending unit
82 petcock valve on 68
84 drain tube from 82

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A pressurized oil injection pre-lubrication system for an oil gallery in an engine block of an engine in a motor vehicle comprising:

a) a pressure accumulator, said pressure accumulator including a storage tank, and a flexible wall within said storage tank for dividing said storage tank into two compartments, in which the first compartment is for holding pressurized gas therein, while the second compartment is for holding the oil therein, said storage tank including a first shell section with the first compartment and having an annular flange thereabout, a second shell section with the second compartment and having an annular flange thereabout, and a plurality of bolts for securing said annular flanges together, said flexible wall being a diaphragm having its circumference sealed between said annular flanges to separate the pressurized gas from the oil;

b) a normally closed electromagnetic valve;

c) means for fluidly connecting said pressure accumulator to said electromagnetic valve;

d) means for fluidly connecting said electromagnetic valve to the oil gallery in the engine block;

e) an ignition switch electrically connected to said electromagnetic valve, so that when said ignition switch is turned to an on position, said electromagnetic valve will open to allow oil from said pressure accumulator to flow into the oil gallery in the engine block, before said ignition switch is turned to a start position to start the engine in the motor vehicle;

f) an annular mounting bracket connected to said first shell section, said mounting bracket having a plurality of holes thereabout, so that it can be affixed to a fire wall in the motor vehicle with a plurality of bolts;

g) a gas injection valve in said first shell section, sot allow gas to enter said first shell section; and h) an air bleeder valve in said second shell section, to allow air to exit said second shell section.

2. A pressurized oil injection pre-lubrication system as recited in claim 1, wherein said electromagnetic valve includes a valve body positioned between said first fluidly connecting means and said second fluidly connecting means.

3. A pressurized oil injection pre-lubrication system as recited in claim 2, wherein said first fluidly connecting means includes:

a) a first conduit connected at a first end to said second shell section of said storage tank; and b) a second conduit connected at a first end by a tee connection to said first conduit and at a second end to a first side of said valve body of said electromagnetic valve.

4. A pressurized oil injection pre-lubrication system as recited in claim 3, wherein said second fluidly connecting means includes:

a) a high pressure oil line connected at a first end to a second side of said valve body of said electromagnetic valve; and b) a tee fitting assembly to connect a second end of said high pressure oil line between an oil gallery connector port and a pipe to an oil pressure gauge within the motor vehicle.

5. A pressurized oil injection pre-lubrication system as recited in claim 4, further including:

a) a petcock valve connected to a second end of said first conduit of said first fluidly connecting means; and b) a drain tube extending from said petcock valve, so that when said petcock valve is opened, the oil in said second shell section can be drained therefrom.

\* \* \* \* \*